United States Patent
Weston et al.

(10) Patent No.: US 12,325,266 B2
(45) Date of Patent: Jun. 10, 2025

(54) BEAD LOCK SNOW CHAIN INTEGRATION

(71) Applicant: Ford Global Technologies, LLC, Dearborn, MI (US)

(72) Inventors: Keith Weston, Canton, MI (US); Brendan Diamond, Grosse Pointe, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 1077 days.

(21) Appl. No.: 17/245,211

(22) Filed: Apr. 30, 2021

(65) Prior Publication Data

US 2022/0348047 A1 Nov. 3, 2022

(51) Int. Cl.
*B60C 27/06* (2006.01)
*B60B 15/26* (2006.01)
*B60B 39/00* (2006.01)

(52) U.S. Cl.
CPC ............ *B60C 27/063* (2013.01); *B60B 15/26* (2013.01); *B60B 39/003* (2013.01); *B60B 39/006* (2013.01)

(58) Field of Classification Search
CPC ... B60C 27/063; B60C 27/061; B60B 15/266; B60B 15/26
See application file for complete search history.

(56) References Cited

U.S. PATENT DOCUMENTS

| | | | | |
|---|---|---|---|---|
| 1,332,273 | A | * 3/1920 | Schick | B60B 15/266 301/41.1 |
| 1,412,040 | A | * 4/1922 | Brelsford | B60C 27/063 152/235 |
| 1,523,499 | A | * 1/1925 | Sullivan | B60C 27/02 152/233 |
| 2,154,035 | A | * 4/1939 | Cuddeback | B60B 15/266 301/40.1 |
| 2,579,057 | A | * 12/1951 | Traver, Sr. | B60C 27/06 152/241 |
| 3,161,217 | A | * 12/1964 | Chartier | B60C 27/02 24/494 |
| 4,324,278 | A | 4/1982 | Guenther | |
| 5,033,522 | A | * 7/1991 | Metraux | B60C 27/063 152/218 |
| 5,147,479 | A | 9/1992 | Koshi et al. | |
| 2009/0095393 | A1 | 4/2009 | Davis et al. | |

FOREIGN PATENT DOCUMENTS

CN 201009695 Y 1/2008

* cited by examiner

*Primary Examiner* — Jason R Bellinger
(74) *Attorney, Agent, or Firm* — Burr & Forman LLP; Lorne Forsythe

(57) ABSTRACT

A tire chain assembly may include a peripheral chain assembly, a chain positioning assembly, and a retention ring. The peripheral chain assembly may extend around tire treads of a tire having an outer sidewall that extends in a radial direction to be operably coupled to a wheel rim. The chain positioning assembly may extend from the peripheral chain assembly over the outer sidewall toward an outer peripheral edge of the wheel rim. The retention ring may attach the chain positioning assembly to the outer peripheral edge of the wheel rim.

20 Claims, 12 Drawing Sheets

BEAD LOCK SNOW CHAIN INTEGRATION

TECHNICAL FIELD

Example embodiments generally relate to systems and devices for snow chain deployment and, more particularly, relate to a system and device for enabling a bead lock ring to retain snow chains to a wheel.

BACKGROUND

Snow chains are beneficial for winter driving in areas that get significant snow falls. Moreover, in some areas, driving on roads may be prohibited during certain times of the year unless vehicles employ snow chains. Meanwhile, since a typical set of snow chains is deployed on a wheel in such a way that the snow chains have a portion on the outer and inner sides of the tire as well as over the treads of the tire, complications for deployment of snow chains on certain vehicles may occur. In this regard, for example, some vehicles that have (or can support use of) large tires may not be compatible with snow chains. However, some snow chain deployment devices have been developed that are aimed at avoiding the typical snow chain design described above in favor of a design that does not include any chain portion on the inner side of the tire. While these designs may accomplish their general goal, they tend to be expensive and bulky, and place a large amount of hardware along the outer side of both the wheel and the tire. In fact, such designs typically prevent access to any part of the wheel rim while in use, and are considered by many to be unattractive.

Thus, it may be desirable to develop improved devices and systems for effective deployment of snow chains that is simpler to employ, effective for its intended purpose, attractive to vehicle owners, and that can also provide improved results.

BRIEF SUMMARY OF SOME EXAMPLES

In accordance with an example embodiment, a tire chain assembly for retaining tire chains on a wheel may be provided. The assembly may include a peripheral chain assembly, a chain positioning assembly, and a retention ring. The peripheral chain assembly may extend around tire treads of a tire having an outer sidewall that extends in a radial direction to be operably coupled to a wheel rim. The chain positioning assembly may extend from the peripheral chain assembly over the outer sidewall toward an outer peripheral edge of the wheel rim. The retention ring may attach the chain positioning assembly to the outer peripheral edge of the wheel rim.

In another example embodiment, a vehicle controller for determining tire chain status may be provided. The vehicle controller may include a location module for determining a location of a vehicle hosting the vehicle controller, a weather module that provides weather information for the location, a road information module providing road information including tire chain usage guidance, and a tire chain module operably coupled to the location module, the weather module and the road information module to determine the tire chain status and provide an indication to a driver of the vehicle based on the tire chain status determined.

BRIEF DESCRIPTION OF THE SEVERAL VIEWS OF THE DRAWING(S)

Having thus described the invention in general terms, reference will now be made to the accompanying drawings, which are not necessarily drawn to scale, and wherein:

Figure 11B:
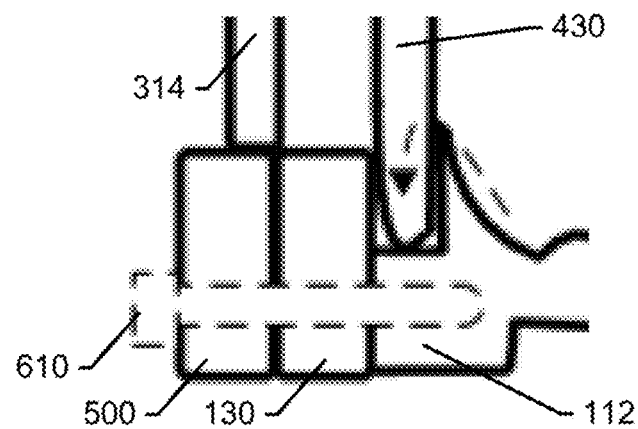
Figure 11A:
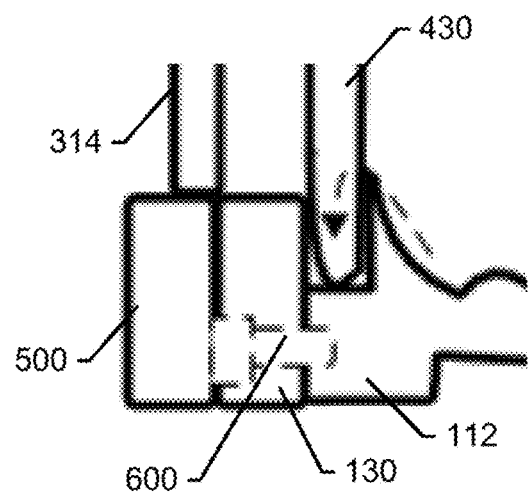
Figure 12:
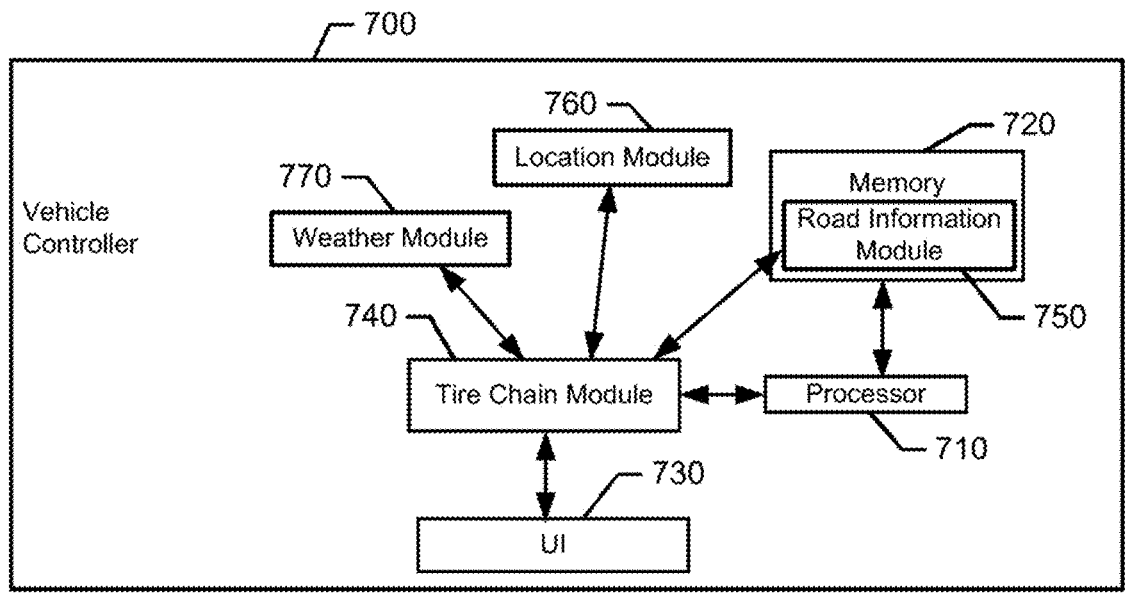

FIG. 11, which is defined by FIGS. 11A and 11B, illustrates a cross section view of other example connections of the chain positioning assembly to the bead lock ring and retention ring in accordance with an example embodiment; and FIG. 12 illustrates a block diagram of a vehicle controller that may be employed to provide guidance or recommendations for tire chain usage responsive to tire chain status determinations in accordance with an example embodiment.

DETAILED DESCRIPTION

Some example embodiments now will be described more fully hereinafter with reference to the accompanying drawings, in which some, but not all example embodiments are shown. Indeed, the examples described and pictured herein should not be construed as being limiting as to the scope, applicability or configuration of the present disclosure. Rather, these example embodiments are provided so that this disclosure will satisfy applicable legal requirements. Like reference numerals refer to like elements throughout. Furthermore, as used herein, the term "or" is to be interpreted as a logical operator that results in true whenever one or more of its operands are true. As used herein, operable coupling should be understood to relate to direct or indirect connection that, in either case, enables functional interconnection of components that are operably coupled to each other. As used herein, the term "assembly" should generally be understood to refer to a unit comprised of components, structures, or portions thereof that have been fitted together.

Larger wheel and tire assemblies may, as noted above, make employment of snow chains (or tire chains) difficult. Example embodiments may provide an improved tire chain assembly for relatively easy installation that enable tire chains to be used even on these vehicles that may otherwise not have a suitable option for employing tire chains. However, example embodiments may further do so by taking advantage of certain components that may already be available in the market, or may be relatively easily modified to adopt characteristics and structures that can be useful in the context of employing tire chains.

In this regard, for example, some wheels for certain classes of vehicles can be provided with an enhancement known as a bead lock ring. The bead of a tire is normally disposed inside the internal lateral edges of a wheel rim. When the tire is filled with air, this bead locks within a channel formed proximate to the internal lateral edges of the wheel rim. Meanwhile, when operating off-road, some vehicles that can employ relatively large tires may benefit (e.g., by expanding the surface area of the tire that contacts the ground or various obstacles) from reducing the air pressure inside the tire.

The bead lock ring changes the position of the bead at the outer sidewall of the tire. In this regard, the bead lock ring is attached to a flange that is formed at the outer peripheral edge of the outside of the wheel. The tire bead is moved outside the lateral edge of the wheel rim, and is then retained between the outer lateral edge of the wheel rim and the bead lock ring by applying torque to threaded fasteners that pass through the bead lock ring and into the flange (or other peripheral edge) of the outside of the wheel. The torque applied to the bead lock ring ensures that the tire can be deflated to improve grip while ensuring that the bead is reliably locked in place.

Vehicles that have the capability to employ the bead lock ring are typically sold from the factory with a non-functional or ornamental bead lock ring, since many customers like the look of the bead lock ring, even when driving on-road for normal vehicle operation. The wheel itself is therefore fully capable of transitioning between the non-functional or ornamental bead lock ring, and a functional bead lock ring. The driver merely needs the capability to move the tire bead to outside the lateral edge of the wheel rim, and apply proper torque to the functional bead lock ring, or do the opposite to shift back to the non-functional or ornamental bead lock ring.

The existence of the flange on wheels adapted for bead lock employment may be advantageously employed in connection with a design that implements a strategy (and corresponding structures) for providing a tire chain assembly that can be employed by such vehicles. The tire chain assembly may avoid any portion of the chain lying adjacent the inner sidewall of the tire (or in any way being on the inner side of the wheel). The tire chain assembly may also keep the portions of the wheel that are proximate to the wheel axis relatively free of obstruction, while also providing the desirable aesthetic appearance of a bead lock ring.

Figure 1:
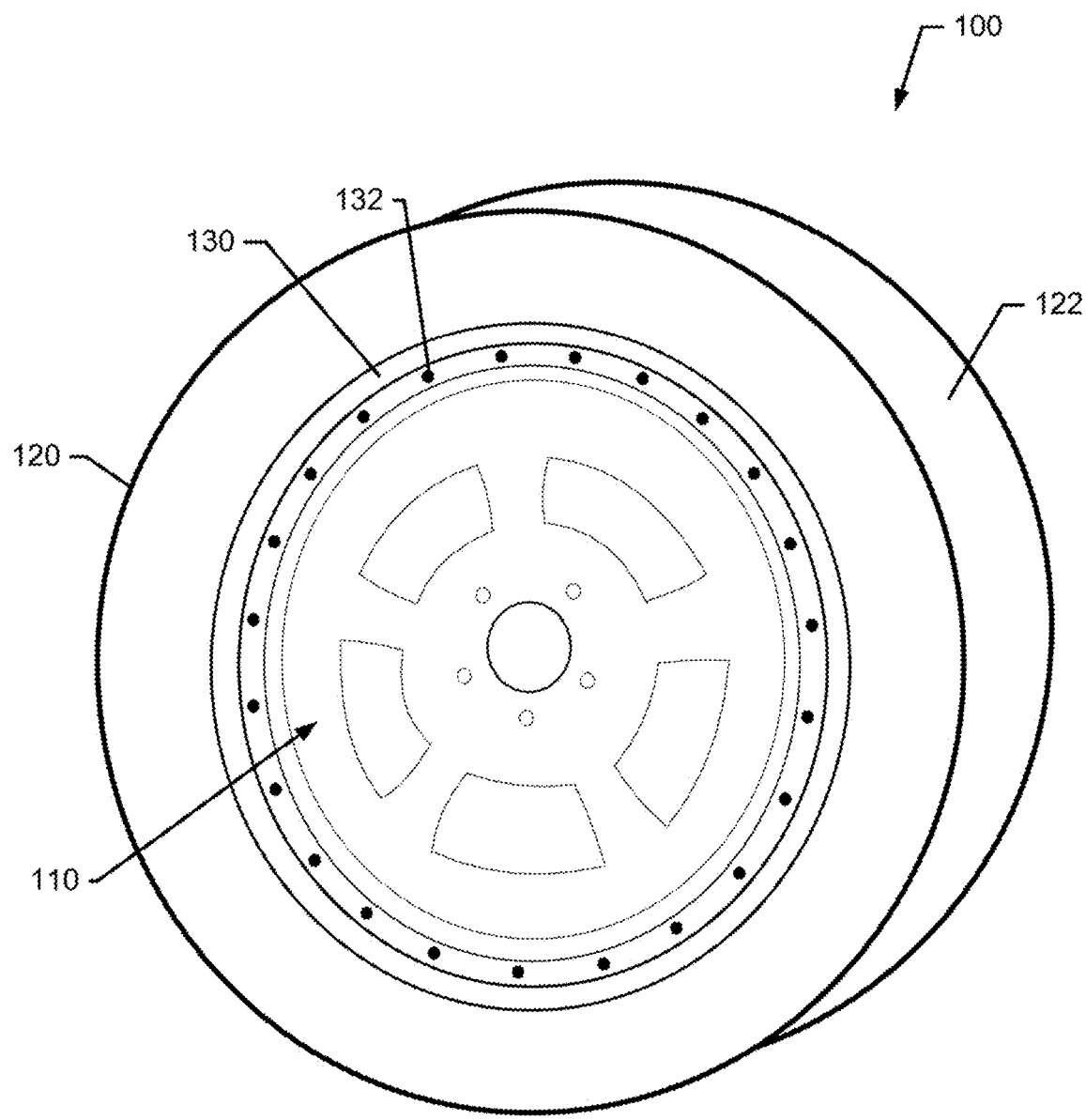
FIG. 1 illustrates a perspective view of a wheel in accordance with an example embodiment.
Figure 2:
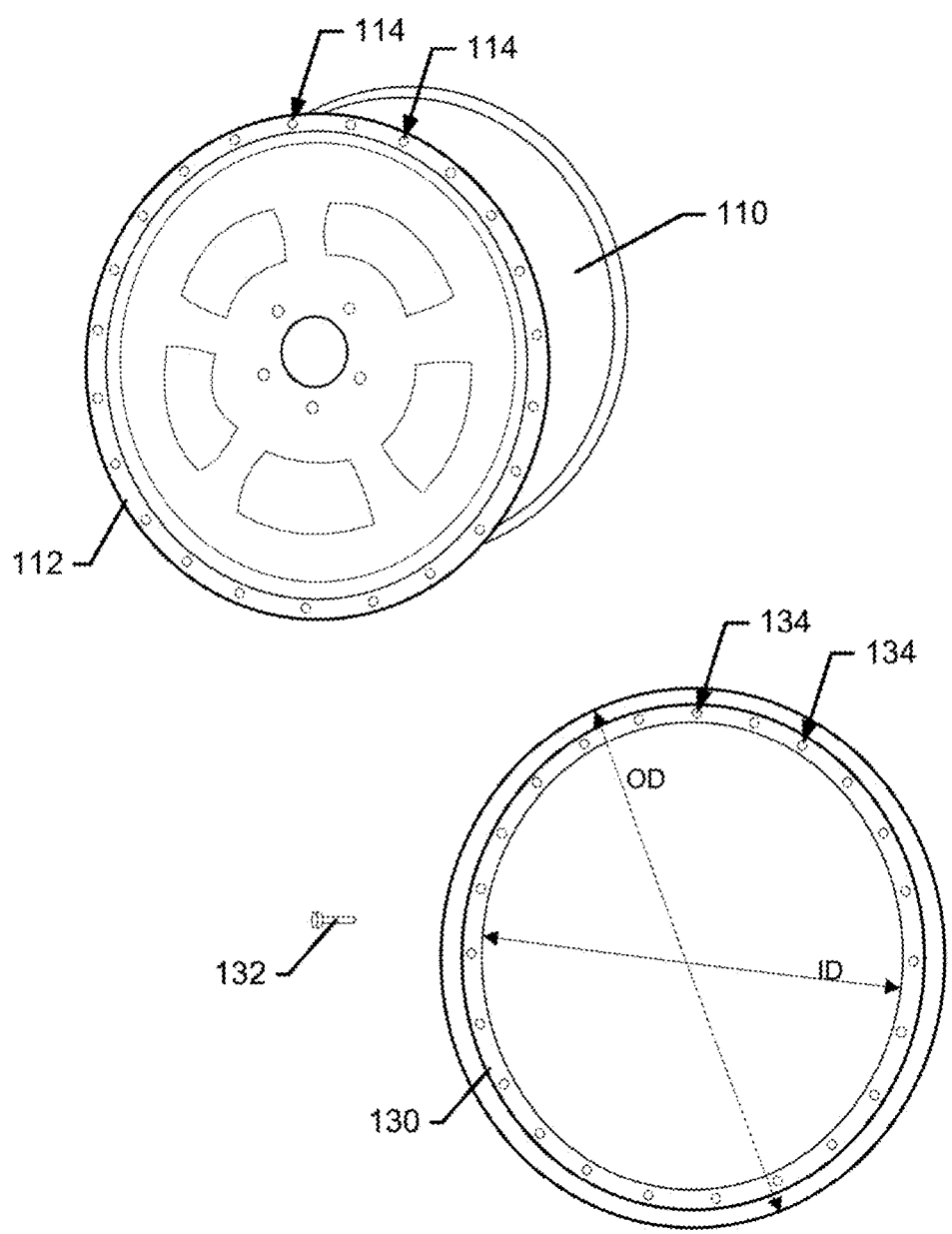
FIG. 2 illustrates a partially exploded perspective view of a wheel rim and bead lock ring according to an example embodiment.

FIG. 1 illustrates a perspective view of a fully assembled wheel 100 including a wheel rim 110, a tire 120 (having tread portion 122) and a bead lock ring 130. The bead lock ring 130 may be held to the wheel rim 110 by a plurality of threaded fasteners 132. FIG. 2 shows a partially exploded view of the wheel 100 of FIG. 1. However, in FIG. 2, the tire 120 is completely omitted along with all but one of the threaded fasteners 132.

Referring to FIGS. 1 and 2, it can be seen that the bead lock ring 130 may be attached to an outer periphery (or flange 112) of the wheel rim 110. In this regard, the flange 112 may include a plurality of threaded receivers 114 formed therein. The threaded receivers 114 may each extend parallel to an axis of the wheel rim 110 and may be equidistant from the axis and from each other.

Meanwhile, the bead lock ring 130 may be an annular component made of metal or a highly durable polymer. The bead lock ring 130 may include a plurality of engagement orifices 134 that are formed at a portion thereof. The engagement orifices 134 may be formed to each extend parallel to an axis of the bead lock ring 130 and may be equidistant from the axis and from each other. Moreover, the distance of the engagement orifices 134 from each other may be equal to the distance between the threaded receivers 114 of the wheel rim 110, and the distance from the engagement orifices 134 to the axis of the bead lock ring 130 may be the same as the distance between the threaded receivers 114 and the axis of the wheel rim 110. Thus, the threaded receivers 114 and the engagement orifices 134 may align with each other so that, when aligned, the threaded fasteners 132 may pass, one through each pair of threaded receivers 114 and the engagement orifices 134, to engage the bead lock ring 130 to the wheel rim 110.

As shown in FIG. 2, the bead lock ring 130 may have an inner diameter (ID) defining an inner periphery of the bead lock ring 130 and an outer diameter (OD) defining an outer periphery of the bead lock ring 130. The inner diameter (ID) may be between about 85% and about 90% of the length of the outer diameter (OD). This keeps the profile of the bead lock ring 130 relatively small, so that the bead lock ring 130 does not obstruct a view of a significant portion of the tire 120, or of the wheel rim 110.

For purposes of the discussion that follows, it does not matter whether the bead lock ring 130 is a functional or non-functional bead lock ring 130. In either case, the bead lock ring 130 could be modified, configured, or otherwise structured to act as a retaining ring in connection with the provision of a tire chain assembly of an example embodiment. Such a tire chain assembly may be configured or adapted to employ the retaining ring (e.g., bead lock ring 130) to assist in holding a peripheral chain assembly 200 shown in FIG. 3 proximate to the tread portion 122 of the tire 120 of FIG. 1.

Figure 3:
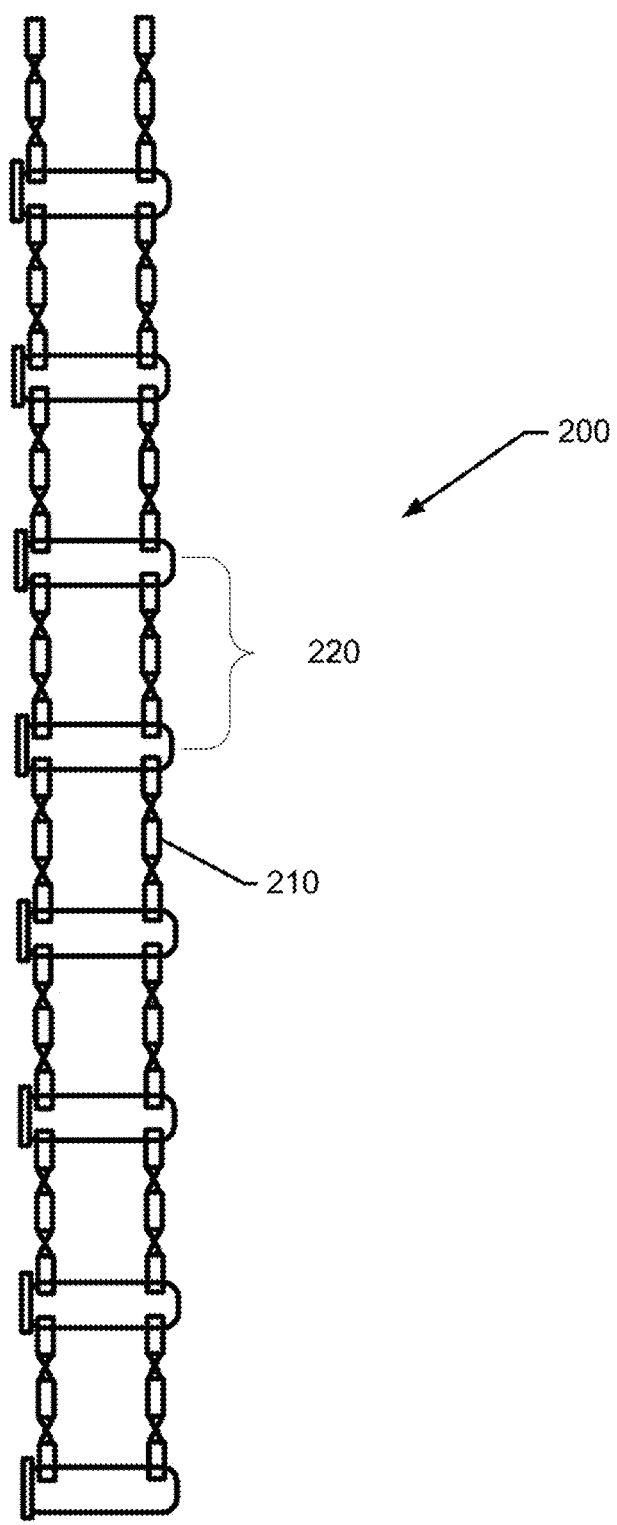
FIG. 3 illustrates an peripheral chain assembly of an example embodiment.

Referring to FIG. 3, the peripheral chain assembly 200 may include a plurality of chain links 210 that interconnect with each other. In some cases, the peripheral chain assembly 200 may include one or more continuous linearly extending chains that may extend parallel to each other. However, neither being parallel nor continuous is required. Indeed, the chain links 210 may engage with each other in any suitable way, including crisscrossing at various points, or including discontinuous segments 220 that are joined together in some way. The connections between chain links 210 (or segments thereof) need only permit freedom of movement so that the chain links 210 can be flexible for application to the tread portion 122 of the tire 120.

Generally speaking, the peripheral chain assembly 200 may be capable of lying flat (e.g., in a plane) when not applied to the wheel 100 of FIG. 1. However, due to the flexible nature of the peripheral chain assembly 200, the chain links 210 and/or segments 220 may be capable of being applied around the periphery (e.g., around the tread portion 122) of the tire 120 from the flat configuration shown in FIG. 3. In this regard, FIG. 4 shows the peripheral chain assembly 200 extended around and proximate to the tread portion 122 of the tire 120.

Figure 4:
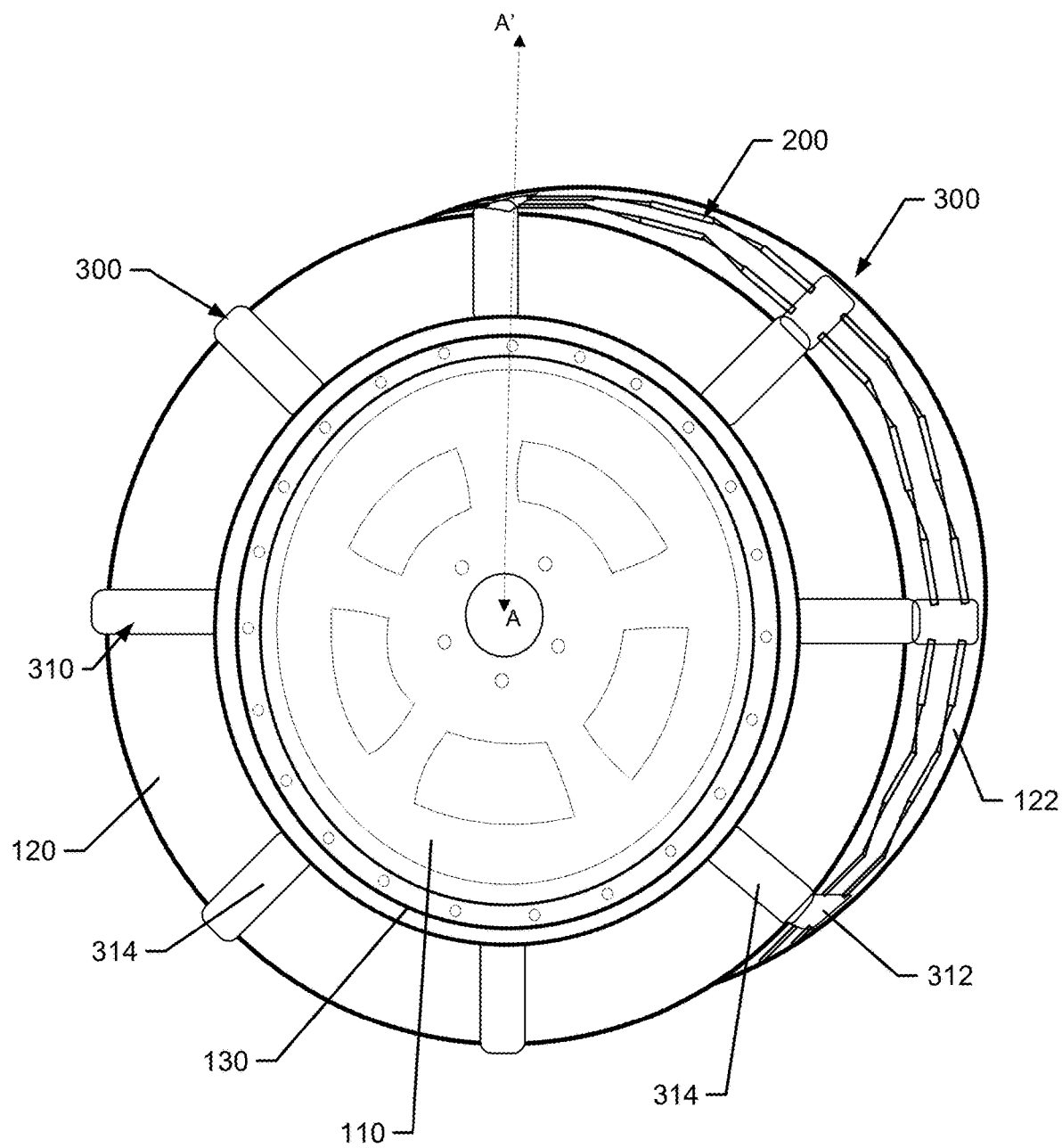
FIG. 4 illustrates a perspective view of the peripheral chain assembly attached to the bead lock ring via a chain positioning assembly in accordance with an example embodiment.
Figure 5:
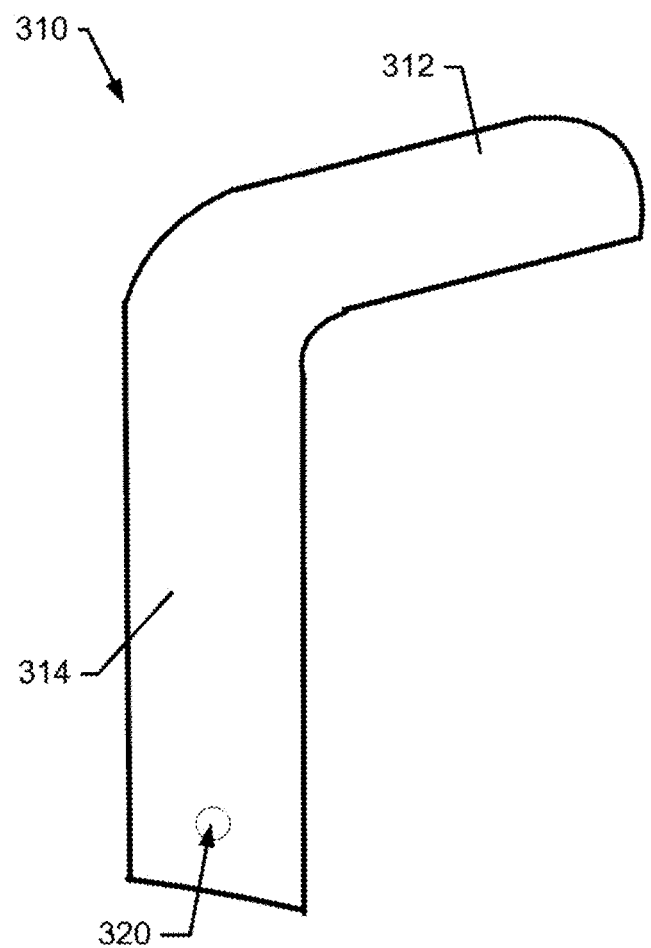
FIG. 5 illustrates a perspective view of an extension arm of the chain positioning assembly in accordance with an example embodiment.

As shown in FIGS. 3 and 4, the chain links 210 and/or segments 220 may be held in place proximate to the tread portion 122 by a chain positioning assembly 300. The chain positioning assembly 300 of this example engages each segment 220 of the peripheral chain assembly 200, and includes a plurality of extension arms 310 that each include a first portion 312 (or first arm portion) and a second portion 314 (or second arm portion). FIG. 5 illustrates a perspective view of one of the extension arms 310 of the chain positioning assembly 300 of FIG. 4. The first portion 312 may extend in a plane substantially parallel to a line tangent to an outer periphery of the tire 120 on which the tire treads are provided (e.g., the plane is tangent to the tread portion 122). In some cases, the first portion 312 may extend parallel to the axis of the wheel rim 110. The second portion 314 may extend substantially perpendicular to the plane from an end of the first portion 312 to the bead lock ring 130 (or retention ring), and therefore substantially perpendicular to the axis of the wheel rim 110. In other words, the second portion 314 extends alongside (and sometimes substantially parallel to) the outer sidewall of the tire 120.

In an example embodiment, the first and second portions 312 and 314 may be formed of a unitary piece of material, or they may be two separately formed, and joined pieces of material. In either case, the material used to make the extension arms 310 may be either a flexible, durable polymer or metal. A proximal end of the second portion 314 may, in some cases, include a receiver 320 or orifice that passes through the second portion 314. A threaded fastener (e.g., threaded fastener 132) may pass through the receiver 320 to secure the second portion 314 to the bead lock ring 130 and/or the flange 112, as described in greater detail below.

The extension arms 310 may hold the segments 220, or more generally hold the peripheral chain assembly 200 in place proximate to the tread portion 122 of the tire 120. Moreover, in doing so, the extension arms 310 may ensure that the peripheral chain assembly 200 extends around the tread portion 122 of the tire 120 (and only the tread portion 122 of the tire 120). Thus, no portion of the peripheral chain assembly 200 (or the chain positioning assembly 300) may extend over or cover any part of an inner sidewall of the tire 120. Additionally, no portion of the chain positioning assembly 300 may extend inside the inner periphery of the bead lock ring 130. Thus, a tire chain assembly of an example embodiment, which includes a retaining ring such as the bead lock ring 130, and also includes the peripheral chain assembly 200 and the chain positioning assembly 300, may advantageously enable tire chain usage without decreasing proximity to vital components, and also while enabling access to the majority (and nearly all) of the otherwise visible portions of the outer face of the wheel rim 110.

Figure 6:
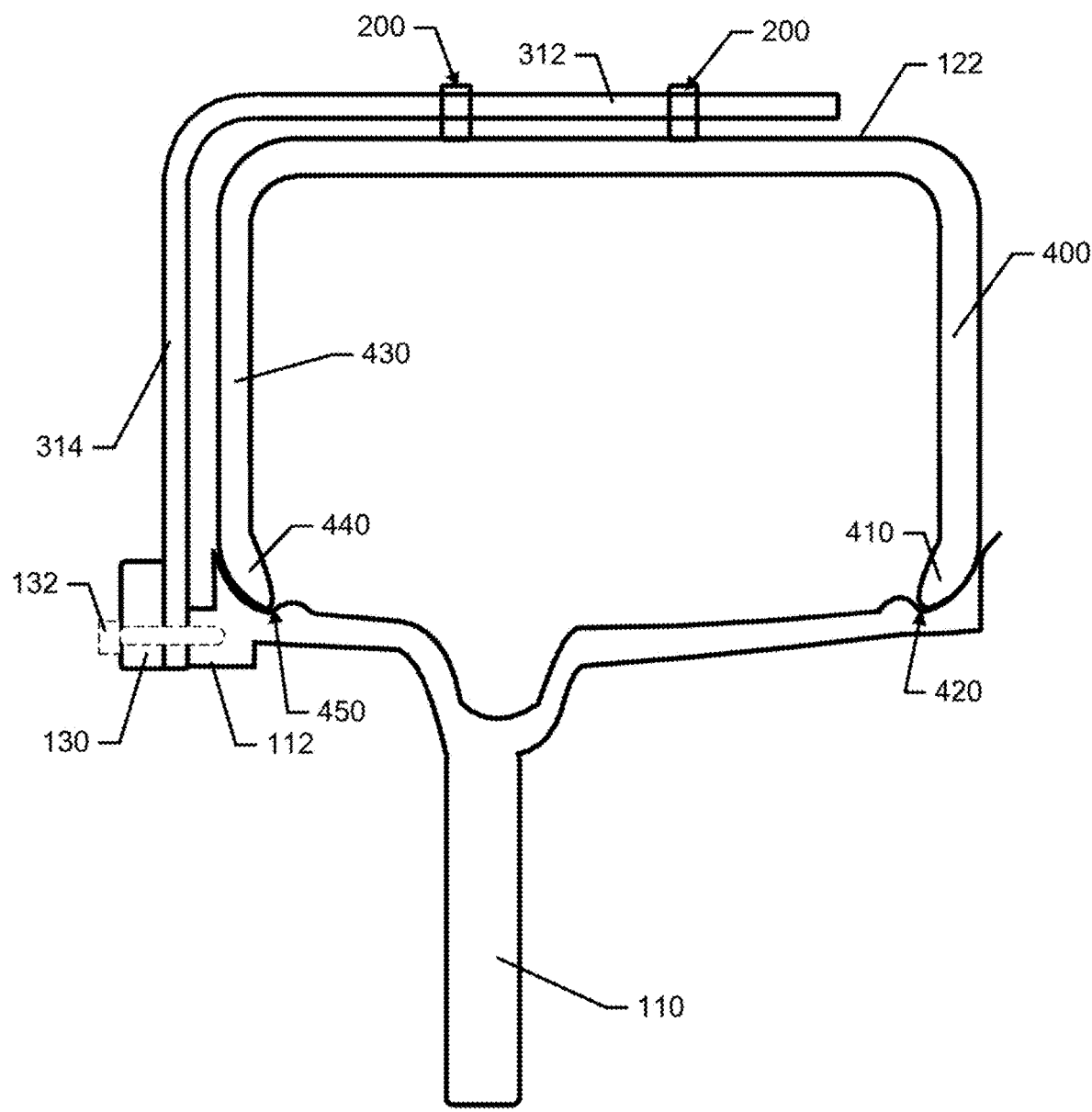
FIG. 6 illustrates a cross section view of one example connection of the chain positioning assembly to the bead lock ring in accordance with an example embodiment.

The relationship of the first and second portions 312 and 314 of the extension arms 310 to the tire 120 and the wheel rim 110 is also shown in the cross section view (taken along line A-A' of FIG. 4) that is provided in FIG. 6. In this regard, the tire 120 is shown in cross section and generally includes an inner sidewall 400 that terminates at a bead 410, which is nested in an inner bead seat portion 420 of the wheel rim 110. The outer sidewall 430 also includes a bead 440 that is nested in an outer bead seat portion 450 of the wheel rim 110. The outer bead seat portion 450 is proximate to the flange 112 of the wheel rim 110.

In this example, the bead lock ring 130 is non-functional (or at least is not functioning) since the bead 440 is located in the outer bead seat portion 450, and is not retained between the bead lock ring 130 and the flange 112. Thus, the bead lock ring 130 is acting as a retaining ring only with respect to the chain positioning assembly 300 and the peripheral chain assembly 200. The threaded fastener 132 passes through the retaining ring (e.g., bead lock ring 130), the receiver 320 of the extension arm 310, and into the flange 112. However, the bead lock ring 130 could alternatively be functional (i.e., functioning as a bead lock ring) as shown in the example of FIG. 7.

Figure 7:
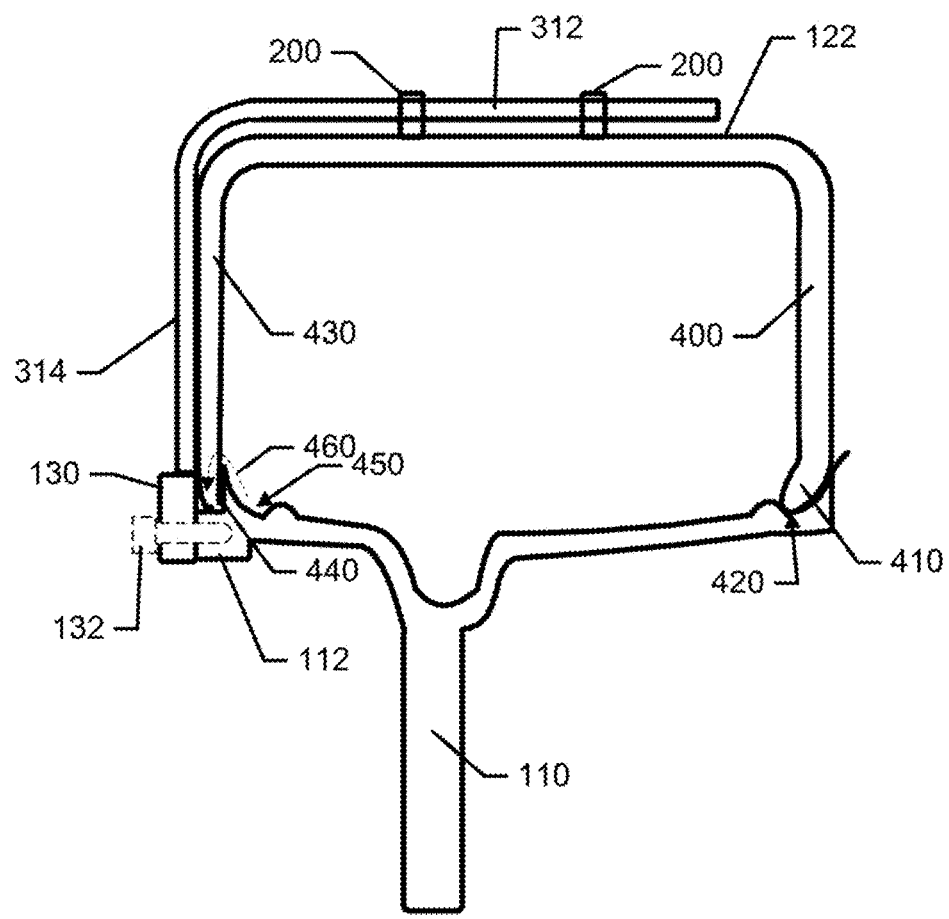
FIG. 7 illustrates a cross section view of another example connection of the chain positioning assembly to the bead lock ring in accordance with an example embodiment.

In FIG. 7, the bead 440 has been moved outside the outer bead seat portion 450 (as shown by arrow 460) and is retained between the bead lock ring 130 and the flange 112. The threaded fastener 132 then passes only through the bead lock ring 130 and the flange 112. Thus, the second portion 314 of the extension arm 310 may be attached to the bead lock ring 130 by another mechanical interface (e.g., hooks, interference fittings, snap fittings, and/or the like).

Figure 8:
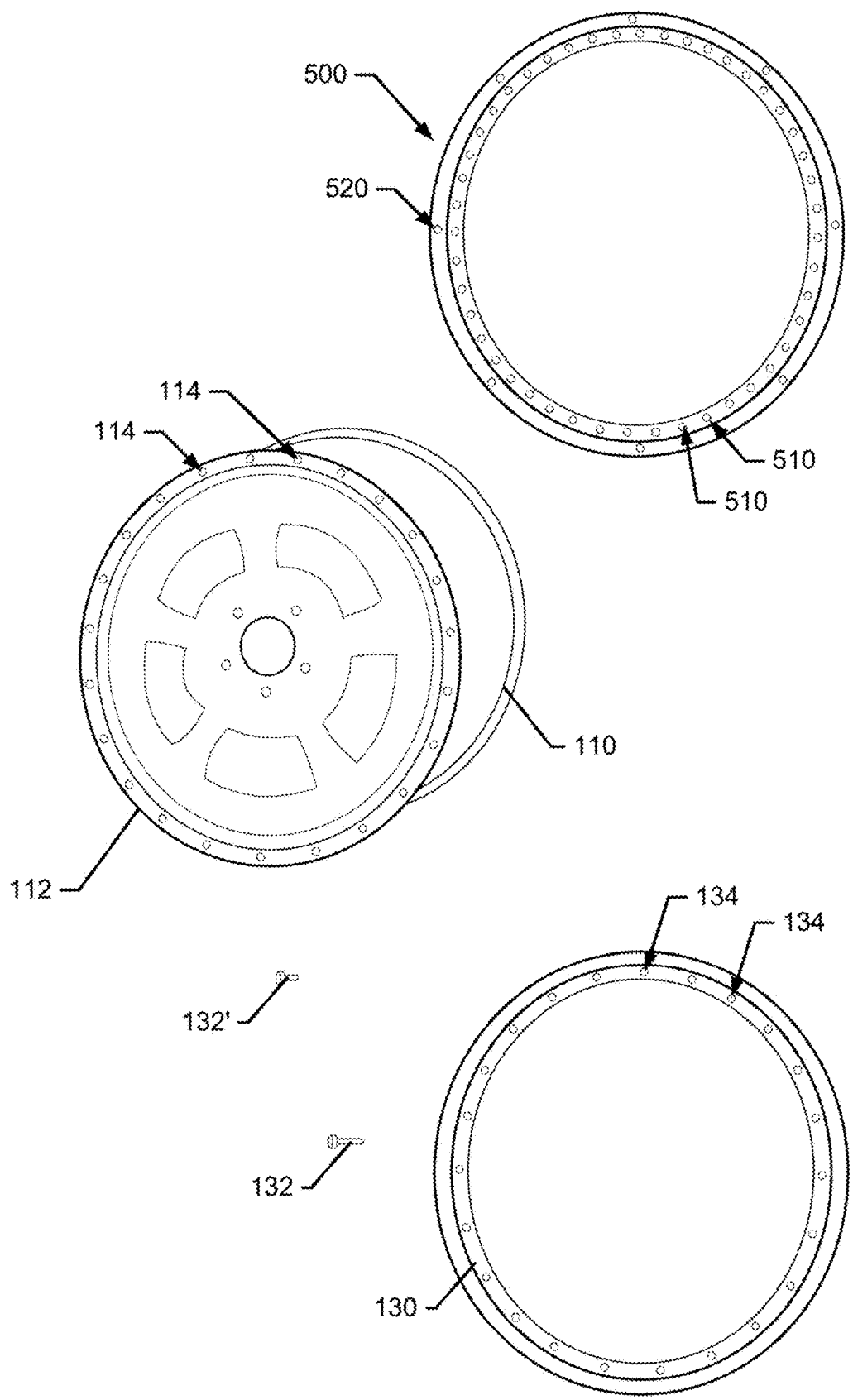
FIG. 8 illustrates a wheel rim, bead lock ring and a retention ring in accordance with an example embodiment.

In other examples, the bead lock ring 130 may be employed as a functioning bead lock ring, and another ring may be employed to act only as a retaining ring for the peripheral chain assembly 200 and the chain positioning assembly 300. FIG. 8 illustrates such an example. In this regard, as shown in FIG. 8, the wheel rim 110 may be identical to those described above, and the bead lock ring 130 may be a functional bead lock ring (or non-functional bead lock ring). Then an additional ring (e.g., retaining ring 500) may be employed over the top of the bead lock ring 130 to interface with (and retain) the peripheral chain assembly 200 and the chain positioning assembly 300.

Figure 9:
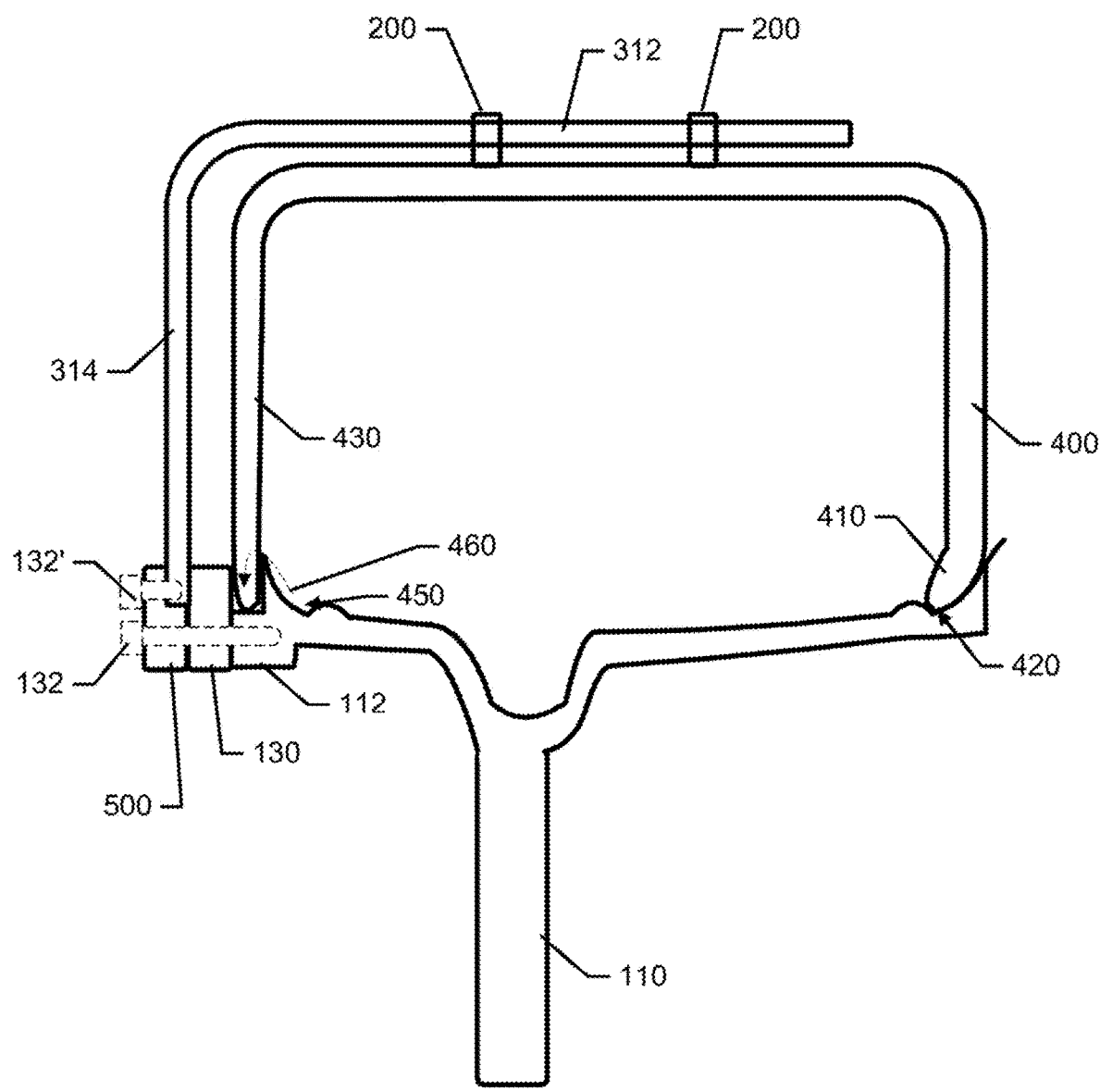
FIG. 9 illustrates a cross section view of one example connection of the chain positioning assembly to the bead lock ring in accordance with an example embodiment.

In the example of FIG. 8, the bead lock ring 130 may be identical to the example of FIG. 7, and may be aligned for attachment to the flange 112 as described above. However, there may be multiple options for ways that the retaining ring 500 may be operably coupled to the bead lock ring 130 and/or the wheel rim 110. The option employed may depend, at least in part, on the structure of the retaining ring 500. In this regard, for example, the retaining ring 500 may have a similar structure to that of the bead lock ring 130 (at least with respect to inclusion and spacing of engagement orifices 510). The engagement orifices 510 may therefore align with the engagement orifices 134, and with the threaded receivers 114. However, in other cases, the retaining ring 500 may further include a second row of engagement orifices 520. In this case, the second row of engagement orifices are spaced farther apart from the axis than the engagement orifices 510, and are not aligned with any of the engagement orifices 134 of the bead lock ring 130 or the threaded receivers 114 of the flange 112. Instead, the second row of engagement orifices 520 may align with a threaded fastener 132' that is used only for connection of the connection of the retention ring 500 to the extension arm 310 (e.g., via threading the threaded fastener 132 into the receiver 320 on the second portion 314). FIG. 9 shows a cross section view for the example described above that employs threaded fastener 132'. The example of FIG. 9 is similar to the example of FIG. 7 in terms of the fastening of the bead lock ring 130 to the flange 112. However, as discussed above, the threaded fastener 132' connects the retaining ring 500 to the second portion 314 of the extension arm 310.

Figure 10:
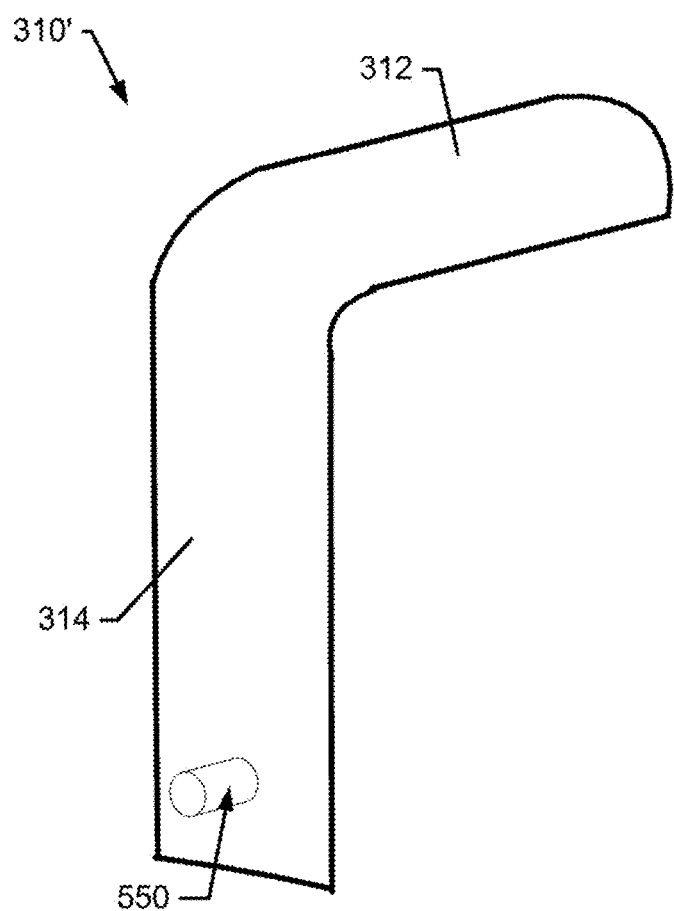
FIG. 10 illustrates a perspective view of an alternative extension arm of the chain positioning assembly in accordance with an example embodiment.

Alternatively, in some cases, the second portion 314 could be instead structured with a mechanical interface (e.g., protrusion 550) shown in FIG. 10 on extension arm 310'. In such an example, the protrusion 550 of each instance of the extension arm 310' may extend through respective ones of the second row of engagement orifices 520 to operably couple the retention ring 500 to the chain positioning assembly 300. In still other examples, application of both the bead lock ring 130 and the retention ring 500 could be accomplished via different attachment methods. For example, in some cases, the bead lock ring 130 could be attached to the flange 112 via shorter threaded fasteners 600, and the retention ring 500 may be attached to the flange 112 via longer threaded fasteners 610 that also pass through the bead lock ring 130. FIG. 11, which is defined by FIGS. 11A and 11B, show the shorter threaded fasteners 600 and longer threaded fasteners 610 of two adjacent engagement orifices in cross section. In some cases, the fasteners may be alternated in each adjacent engagement orifice.

Example embodiments may make it relatively easy for drivers to install the tire chain assembly described above (regardless of the specific form). The easy and effective use of the tire chain assembly, which can be installed or removed in many cases simply by pulling over and using a wrench to operate threaded fasteners to install/remove them along with the retention ring 500 and/or bead lock ring 130, may further make the provision of guidance, notifications or recommendations for the driver regarding usage of the tire chain assembly practical and useful. In an example embodiment, a vehicle controller 700 may be programmed to include a module or software application that is configured to provide such functionality as shown in the example of FIG. 12.

Referring to FIG. 12, the vehicle controller 700 may be a portion of, or otherwise operably coupled to, a vehicle control unit (VCU) of the vehicle. However, the vehicle controller 700 could alternatively be part of another control unit of the vehicle, or may be a standalone unit. In any case, the vehicle controller 700 may include processing circuitry (e.g., processor 710 and memory 720) that is configurable to perform data processing as described herein. As such, for example, the vehicle controller 700 may include (or otherwise have access to) memory (e.g., the memory 720) for storing instructions or applications for the performance of various functions and a corresponding processor (e.g., processor 710) for executing stored instructions or applications. The vehicle controller 700 may also include software and/or corresponding hardware for enabling the performance of the respective functions of the vehicle controller 700 including, for example, the monitoring of current conditions associated with the vehicle and its surroundings in order to make a recommendation or guidance output regarding the employment of the tire chain assembly described above.

In an example embodiment, the processing circuitry (e.g., the processor 710 and memory 720) may be in communication with or otherwise control a user interface 730 and a tire chain module 740. As such, the processing circuitry may be embodied as a circuit chip (e.g., an integrated circuit chip) configured (e.g., with hardware, software or a combination of hardware and software) to perform operations described herein.

The user interface 730 may be in communication with the processing circuitry to receive an indication of a user input at the user interface 730 and/or to provide an audible, visual, mechanical or other output to the user. As such, the user interface 730 may include, for example, a keyboard, a mouse, a joystick, a display, a touch screen, a microphone, a speaker, or other input/output mechanisms. In some cases, the user interface 730 may also include a series of knobs, dials, levers, lights or web pages/interface consoles generated to guide the user through various options, commands, flow paths and/or the like for control of or interaction with the tire chain module 740.

In an example embodiment, the memory 720 may include one or more non-transitory storage or memory devices such as, for example, volatile and/or non-volatile memory that may be either fixed or removable. The memory 720 may be configured to store information, data, applications, instructions or the like for enabling the apparatus to carry out various functions in accordance with example embodiments of the present invention. For example, the memory 720 could be configured to buffer input data for processing by the processor 710. Additionally or alternatively, the memory 720 could be configured to store instructions for execution by the processor 710. As yet another option, the memory 720 may include one of a plurality of databases that may store a variety of files, contents or data sets, or structures used to enable determinations associated with operation of the tire chain module 740. Among the contents of the memory 720, applications may be stored for execution by the processor 710 in order to carry out the functionality associated with each respective application. In one example, the contents of the memory 720 may include a road information module 750 storing road information. The road information may include information indicative of road conditions for various roads or location (e.g., paving status, quality of surface, off-road vs. on-road, track).

The processor 710 may be embodied in a number of different ways. For example, the processor 710 may be embodied as various processing means such as a microprocessor or other processing element, a coprocessor, a controller or various other computing or processing devices including integrated circuits such as, for example, an ASIC (application specific integrated circuit), an FPGA (field programmable gate array), a hardware accelerator, or the like. In an example embodiment, the processor 710 may be configured to execute instructions stored in the memory 720 or otherwise accessible to the processor 710. As such, whether configured by hardware or software methods, or by a combination thereof, the processor 710 may represent an entity (e.g., physically embodied in circuitry) capable of performing operations according to embodiments of the present invention while configured accordingly. Thus, for example, when the processor 710 is embodied as an ASIC, FPGA or the like, the processor 710 may be specifically configured hardware for conducting the operations described herein. Alternatively, as another example, when the processor 710 is embodied as an executor of software instructions, the instructions may specifically configure the processor 710 to perform the operations described herein.

In an example embodiment, the processor 710 (or the processing circuitry) may be embodied as, include or otherwise control the tire chain module 740, which may be any means such as a device or circuitry operating in accordance with software or otherwise embodied in hardware or a combination of hardware and software (e.g., processor 710 operating under software control, the processor 710 embodied as an ASIC or FPGA specifically configured to perform the operations described herein, or a combination thereof) thereby configuring the device or circuitry to perform the corresponding functions of the tire chain module 740 as described herein.

The tire chain module 740 may operate based on information provided by the road information module 750, a location module 760 and a weather module 770 that may also be portions of the (or in communication with) the vehicle controller 700. The tire chain module 740 may include programming that is configured to determining tire chain status for the vehicle controller 700. In this regard, the location module 760 may be a global positioning system (GPS) or other location service that determines a location of the vehicle. The location module 740 may, in some cases, be further configured to extrapolate future movement of the vehicle (e.g., based on speed and direction, or based on a set destination provided to a guidance program). The weather module 770 may be configured to access or otherwise provide weather information for the location. Meanwhile, the road information may include tire chain usage guidance that is dependent on weather, road conditions, specific road identification, or the like. The tire chain module 740 may be configured to receive information from the location module, the weather module and the road information module to determine the tire chain status and provide an indication to a driver of the vehicle based on the tire chain status determined.

In an example embodiment, the road information may include regulatory information descriptive of legal requirements associated with employment of tire chains on the vehicle (e.g., for a given road and/or time of year). In some cases, determining the tire chain status may include extrapolating vehicle movement into the future (via the location module 760. In such an example, the tire chain status may include a recommendation to install tire chains on the vehicle prior to entry onto a road or into a location in which tire chain usage is required by the regulatory or legal requirements associated with the road or location. In an example embodiment, determining the tire chain status may include determining that the weather information, the road information and/or the location correspond to conditions in which tire chain usage is not required or recommended. Thus, the tire chain status may include a recommendation to remove tire chains on the vehicle prior to entry onto a road or into a location in which tire chain usage is required. In some cases, the road information may include information indicative of whether the vehicle is off-road or on-road. In such context, the tire chain status may include a recommendation to install tire chains on the vehicle when the vehicle is off-road and remove the tire chains when the vehicle is on-road. Thus, as can be appreciated from the descriptions above, the tire chain module 740 may be enabled to employ geo-fencing to identify area in which tire chains could or even should be used, and other areas in which tire chains should not be used. The user interface 730 may be used to present such information to the driver of the vehicle.

In an example embodiment, a tire chain assembly may be provided. The assembly may include a peripheral chain assembly, a chain positioning assembly, and a retention ring. The peripheral chain assembly may extend around tire treads of a tire having an outer sidewall that extends in a radial direction to be operably coupled to a wheel rim. The chain positioning assembly may extend from the peripheral chain assembly over the outer sidewall toward an outer peripheral edge of the wheel rim. The retention ring may attach the chain positioning assembly to the outer peripheral edge of the wheel rim.

The assembly of some embodiments may include additional features, modifications, augmentations and/or the like to achieve further objectives or enhance performance of the assembly. The additional features, modifications, augmentations and/or the like may be added in any combination with each other. Below is a list of various additional features, modifications, and augmentations that can each be added individually or in any combination with each other. For example, the retention ring may be a bead lock ring. In an example embodiment, the bead lock ring may include a plurality of engagement orifices. The engagement orifices may include a first set of engagement orifices through which threaded fasteners extend to operably couple the retention ring to the outer peripheral edge of the wheel rim. In some cases, the engagement orifices may include a second set of engagement orifices that engage the chain positioning assembly. In an example embodiment, a bead associated with the outer sidewall of the tire may be mounted laterally outside the outer peripheral edge of the wheel rim and may be retained by the bead lock ring. In some cases, the retention ring may be operably coupled to a bead lock ring. In an example embodiment, the bead lock ring may include a first set of engagement orifices and the retention ring comprises a second set of engagement orifices. A plurality of threaded fasteners may operably couple the first set of engagement orifices, the second set of engagement orifices, and threaded receivers formed in the outer peripheral edge of the wheel rim. In some cases, the bead lock ring may include a first set of engagement orifices and the retention ring comprises a second set of engagement orifices. A first set of threaded fasteners may operably couple at least some of the first set of engagement orifices to the peripheral edge of the wheel rim, and a second set of threaded fasteners may operable couple the second set of engagement orifices to others of the first set engagement orifices. In an example embodiment, the retention ring may have an inner diameter defining an inner periphery of the retention ring and an outer diameter defining an outer periphery of the retention ring. The inner diameter may be between about 85% and about 90% of the outer diameter. In some cases, no portion of the retention ring or the chain positioning assembly may extend inside the inner periphery. In an example embodiment, no portion of the chain positioning assembly or the peripheral chain assembly extends over an inner sidewall of the tire. In some cases, the chain positioning assembly may include a plurality of extension arms that each include a first portion extending in a plane substantially parallel to a line tangent to an outer periphery of the tire on which the tire treads are provided, and a second portion that extends substantially perpendicular to the plane from the first portion to the retention ring. In an example embodiment, the first and second portions may be formed of a unitary piece of material, and the material may be either a flexible, durable polymer or metal. In some cases, the second portion may include a receiver, and a threaded fastener may operably couples the second portion to the retaining ring via the receiver. In an example embodiment, the second portion may include an interface member, and the interface member may operably couple the second portion to the retaining ring.

Many modifications and other embodiments of the inventions set forth herein will come to mind to one skilled in the art to which these inventions pertain having the benefit of the teachings presented in the foregoing descriptions and the associated drawings. Therefore, it is to be understood that the inventions are not to be limited to the specific embodiments disclosed and that modifications and other embodiments are intended to be included within the scope of the appended claims. Moreover, although the foregoing descriptions and the associated drawings describe exemplary embodiments in the context of certain exemplary combinations of elements and/or functions, it should be appreciated that different combinations of elements and/or functions may be provided by alternative embodiments without departing from the scope of the appended claims. In this regard, for example, different combinations of elements and/or functions than those explicitly described above are also contemplated as may be set forth in some of the appended claims. In cases where advantages, benefits or solutions to problems are described herein, it should be appreciated that such advantages, benefits and/or solutions may be applicable to some example embodiments, but not necessarily all example embodiments. Thus, any advantages, benefits or solutions described herein should not be thought of as being critical, required or essential to all embodiments or to that which is claimed herein. Although specific terms are employed herein, they are used in a generic and descriptive sense only and not for purposes of limitation.

That which is claimed:

1. A tire chain assembly comprising:
a peripheral chain assembly that extends around tire treads of a tire having an outer sidewall that extends in a radial direction to be operably coupled to a wheel rim;
a chain positioning assembly that extends from the peripheral chain assembly over the outer sidewall toward an outer peripheral edge of the wheel rim; and
a retention ring attaching the chain positioning assembly to the outer peripheral edge of the wheel rim,
wherein the retention ring is a bead lock ring.

2. The assembly of claim 1, wherein the bead lock ring comprises a plurality of engagement orifices, and
wherein the engagement orifices include a first set of engagement orifices through which threaded fasteners extend to operably couple the retention ring to the outer peripheral edge of the wheel rim.

3. The assembly of claim 2, wherein the engagement orifices include a second set of engagement orifices that engage the chain positioning assembly.

4. The assembly of claim 1, wherein a bead associated with the outer sidewall of the tire is mounted laterally outside the outer peripheral edge of the wheel rim and retained by the bead lock ring.

5. A tire chain assembly comprising:
a peripheral chain assembly that extends around tire treads of a tire having an outer sidewall that extends in a radial direction to be operably coupled to a wheel rim;
a chain positioning assembly that extends from the peripheral chain assembly over the outer sidewall toward an outer peripheral edge of the wheel rim; and
a retention ring attaching the chain positioning assembly to the outer peripheral edge of the wheel rim,
wherein the retention ring is operably coupled to a bead lock ring.

6. The assembly of claim 5, wherein the bead lock ring comprises a first set of engagement orifices and the retention ring comprises a second set of engagement orifices, and
wherein a plurality of threaded fasteners operably couple the first set of engagement orifices, the second set of engagement orifices, and threaded receivers formed in the outer peripheral edge of the wheel rim.

7. The assembly of claim 5, wherein the bead lock ring comprises a first set of engagement orifices and the retention ring comprises a second set of engagement orifices,
wherein a first set of threaded fasteners operably couple at least one of the first set of engagement orifices to the peripheral edge of the wheel rim, and
wherein a second set of threaded fasteners operable couple the second set of engagement orifices to others of the first set engagement orifices.

8. The assembly of claim 1, wherein the retention ring has an inner diameter defining an inner periphery of the retention ring and an outer diameter defining an outer periphery of the retention ring, and
wherein the inner diameter is between 85% and 90% of the outer diameter.

9. The assembly of claim 8, wherein no portion of the retention ring or the chain positioning assembly extends inside the inner periphery.

10. The assembly of claim 9, wherein no portion of the chain positioning assembly or the peripheral chain assembly extends over an inner sidewall of the tire.

11. The assembly of claim 1, wherein the chain positioning assembly comprises a plurality of extension arms that each include:
a first portion extending in a plane substantially parallel to a line tangent to an outer periphery of the tire on which the tire treads are provided; and
a second portion that extends substantially perpendicular to the plane from the first portion to the retention ring.

12. The assembly of claim 11, wherein the first and second portions are formed of a unitary piece of material, and
wherein the material is a flexible, durable polymer or metal.

13. The assembly of claim 11, wherein the second portion comprises a receiver, and
wherein a threaded fastener operably couples the second portion to the retaining ring due to the receiver.

14. The assembly of claim 11, wherein the second portion comprises an interface member, and
wherein the interface member operably couples the second portion to the retaining ring.

15. The assembly of claim 5, wherein the retention ring has an inner diameter defining an inner periphery of the retention ring and an outer diameter defining an outer periphery of the retention ring, and
wherein the inner diameter is between 85% and 90% of the outer diameter.

16. The assembly of claim 15, wherein no portion of the retention ring or the chain positioning assembly extends inside the inner periphery.

17. The assembly of claim 16, wherein no portion of the chain positioning assembly or the peripheral chain assembly extends over an inner sidewall of the tire.

18. The assembly of claim 5, wherein the chain positioning assembly comprises a plurality of extension arms that each include:
a first portion extending in a plane substantially parallel to a line tangent to an outer periphery of the tire on which the tire treads are provided; and
a second portion that extends substantially perpendicular to the plane from the first portion to the retention ring.

19. The assembly of claim 18, wherein the first and second portions are formed of a unitary piece of material, and
wherein the material is a flexible, durable polymer or metal.

20. The assembly of claim 18, wherein the second portion comprises a receiver, and
wherein a threaded fastener operably couples the second portion to the retaining ring due to the receiver.

* * * * *